United States Patent [19]

Hays

[11] Patent Number: 5,499,704
[45] Date of Patent: Mar. 19, 1996

[54] AUTOMOTIVE CLUTCHES

[76] Inventor: Bill J. Hays, 15114 Adams St., Midway City, Calif. 92655

[21] Appl. No.: 312,281
[22] Filed: Sep. 26, 1994

Related U.S. Application Data

[63] Continuation-in-part of Ser. No. 69,388, Jun. 1, 1993, Pat. No. 5,375,688.
[51] Int. Cl.$^6$ .............................. F16B 13/50; F16B 13/71
[52] U.S. Cl. ................... 192/70.27; 192/89.23; 192/89.24; 192/110 B
[58] Field of Search .................... 192/70.27, 89.22, 192/89.23, 89.24, 110 B

[56] References Cited

U.S. PATENT DOCUMENTS

| | | | |
|---|---|---|---|
| 3,216,543 | 11/1965 | Schröter | 192/89.22 X |
| 5,375,688 | 12/1994 | Hays | 192/70.27 |

FOREIGN PATENT DOCUMENTS

| | | | |
|---|---|---|---|
| 2222570 | 10/1974 | France | 192/89.23 |

*Primary Examiner*—Richard M. Lorence
*Attorney, Agent, or Firm*—Plante & Strauss

[57] ABSTRACT

There is disclosed an improved automotive clutch in which the clutch diaphragm is supported by a subassembly of a plurality of circumferentially spaced-apart spherical balls which includes a center locator to orient the subassembly on the center line of the clutch. In some applications the subassembly of balls and retainer ring can also be provided as the fulcrum support for the diaphragm. In the pull-off type of clutch, the base of the diaphragm is supported by a subassembly of balls and retainer ring which is carried on the undersurface of the clutch housing cover, and an additional subassembly of balls and retainer ring can be provided on the upper surface of the pressure plate. The subassembly of the balls and retainer ring greatly facilitates, and enhances the precision of an installation in an automotive clutch.

20 Claims, 5 Drawing Sheets

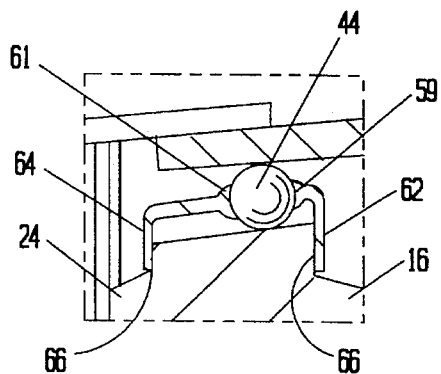
FIGURE 4
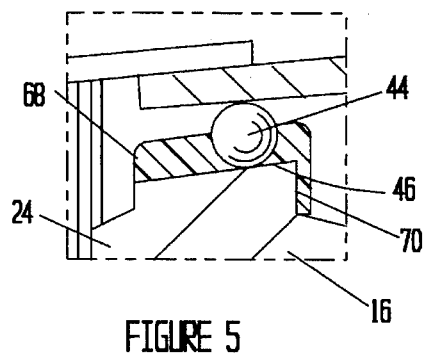
FIGURE 5
FIGURE 6
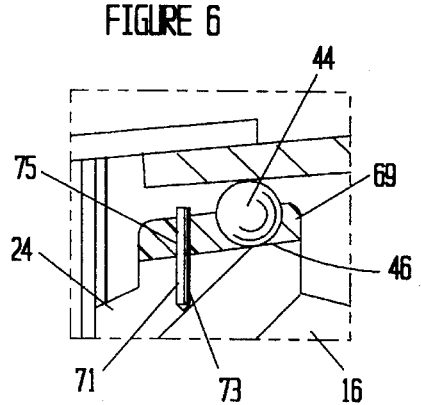
FIGURE 7
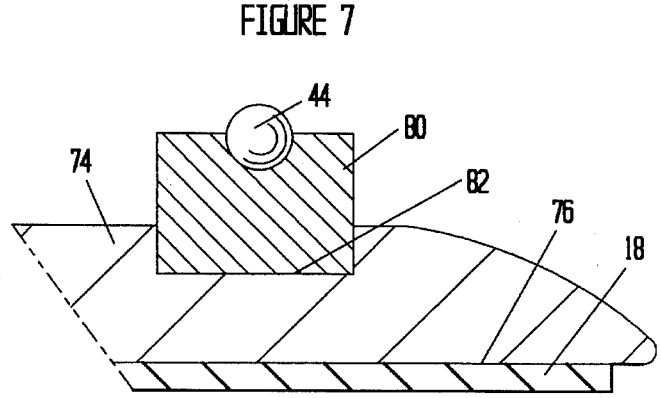

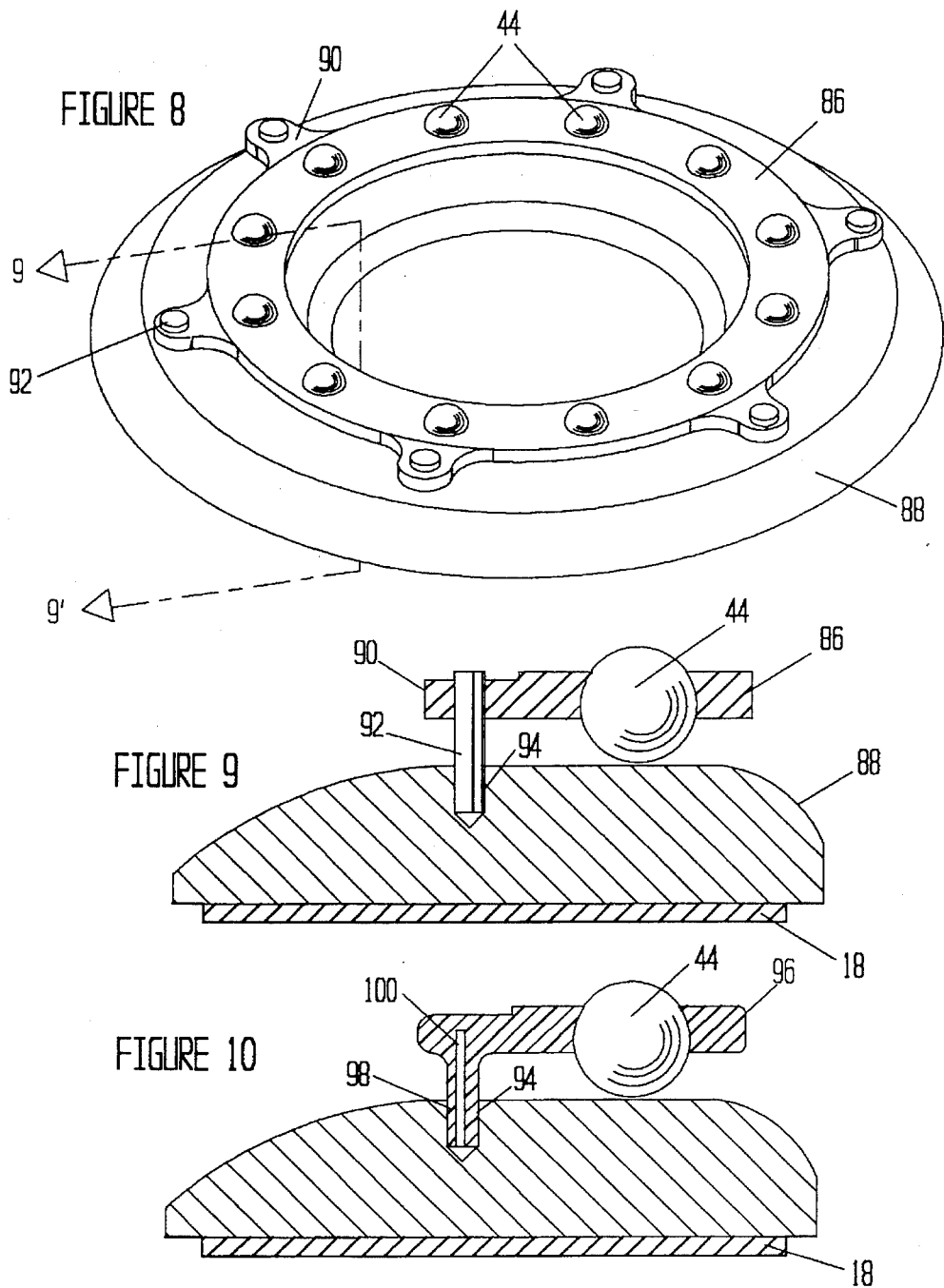

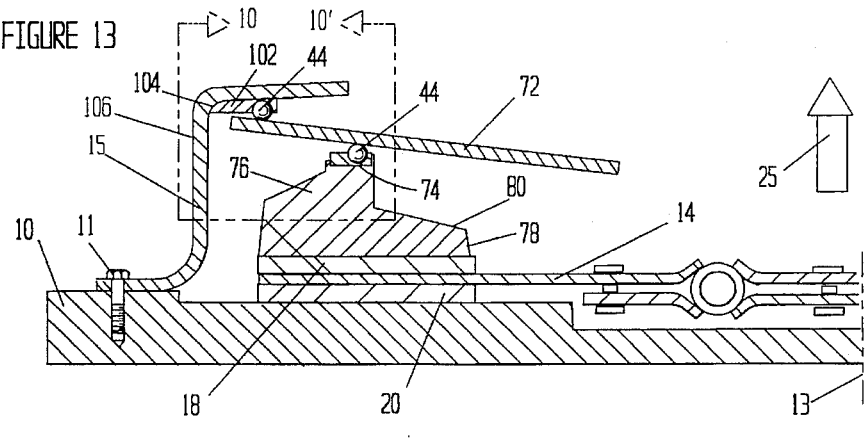
FIGURE 13
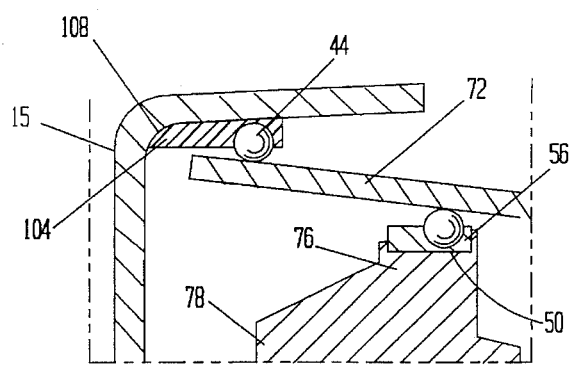
FIGURE 14
FIGURE 15

AUTOMOTIVE CLUTCHES

RELATIONSHIP TO OTHER APPLICATIONS

This application is a continuation-in-part of my application, Ser. No. 08/069,388, filed Jun. 1, 1993, now U.S. Pat. No. 5,375,688.

BACKGROUND OF THE INVENTION

1. Field of the Invention

This invention relates to improvements in automotive clutches and, in particular, to an improvement for mounting and supporting diaphragms in diaphragm clutches.

2. Brief Statement of the Prior Art

Diaphragm or Bellville clutches are the most commonly used in the automotive industry. In the typical automotive clutch, the clutch disc is supported between a pressure plate and the flywheel. A clutch housing cover which holds onto the flywheel surrounds the pressure plate and supports a spring diaphragm, also known as a Bellville diaphragm which supplies the clamp load to compress the clutch disc between the pressure plate and flywheel when the clutch is engaged. The diaphragm has a fulcrum support on the clutch housing cover and the base of the diaphragm rests on a raised circular rim on the upper surface of the pressure plate. When the diaphragm reverses its position between clutch engagement and disengagement, the base of the diaphragm rubs against this circular rim, with frictional losses that cause hysterisis in the clamp load between engagement and disengagement, and objectionable wear on the rim of the pressure plate.

The most common diaphragm clutches are the push off type in which a force is applied downwardly against the center fingers of the diaphragm to cause it to move release the pressure plate into a position disengaging the clutch disc. Recent changes, spurred by the desire to minimize size and bulk of automotive components has lead to the development of the pull off type clutch in which a lifting force is applied to the fingers of the diaphragm to release the pressure plate. In this clutch design, the base of the diaphragm rests against the underside of the clutch housing cover, and an inner annular area of the diaphragm bears against the raised rim on the pressure plate.

In both designs, however, the diaphragm rubs against a raised stationary rim of the upper surface of the pressure plate, and the clutches suffer the hysterisis and wear problems previously mentioned.

In my parent application, I have disclosed improvements in automotive clutches in which the diaphragm is supported by balls carried in a circular groove in the pressure plate and supported in circumferentially spaced-apart locations by a retainer ring. In the pull-off type of clutch, the base of the diaphragm is supported by balls carried on the undersurface of the clutch housing cover, and additional balls are provided on a raised rim on the pressure plate. While the invention as disclosed in my prior application secures a more efficient clutch operation than previous clutches, it is desirable to modify the invention to adapt it to mass manufacture and simplicity of installation.

OBJECTIVES OF THE INVENTION

It is an objective of this invention to provide an improvement in clutches which reduces wear of the diaphragm on the pressure plate of the clutch.

It is also an objective of this invention to provide an automotive clutch with superior operating characteristics.

It is a further object of the invention to provide a modification of an automotive clutch which can be readily retrofitted to existing clutches without substantial machining or replacement of parts.

It is particularly an object of this invention to provide a modification of automotive clutches with a minimal amount of machining and assembly.

Other and related objectives will be apparent from the following description of the invention.

BRIEF STATEMENT OF THE INVENTION

This invention comprises a modification of a typical automotive clutch in which the fulcrum support for the diaphragm spring is formed as a subassembly of a plurality of balls embedded in a retainer ring at circumferentially spaced-apart locations, and in which the subassembly is secured in the clutch assembly with a center locator. The center locator can be a groove in the receiving surface such as the pressure plate, or can be annular flanges or brackets carried by the retainer ring which coact with the receiving clutch assembly to orient the subassembly on the center line of the clutch.

BRIEF DESCRIPTION OF THE DRAWINGS

The invention will be described with reference to the figures of which;

FIGS. 3 to 6 are views of alternative modifications of the clutch of FIG. 1;

FIG. 7 is an elevational sectional view of a pressure plate modified in accordance with the invention;

FIG. 8 is a perspective view of a pressure plate modified in accordance with the invention;

FIG. 9 is a sectional view along line 9'—9' of FIG. 8;

FIG. 10 illustrates an embodiment of the invention which is an alternative to that shown in FIG. 8;

FIG. 13 is an elevational sectional view of a typical pull-off automotive clutch modified in accordance with the invention;

FIG. 14 is an enlarged view of the area within the box marked 14–14' of FIG. 13; and FIG. 15 is a view of a modification of the clutch of FIG. 13 which is alternative to that shown in FIG. 14.

DESCRIPTION OF PREFERRED EMBODIMENT

Figure 1:
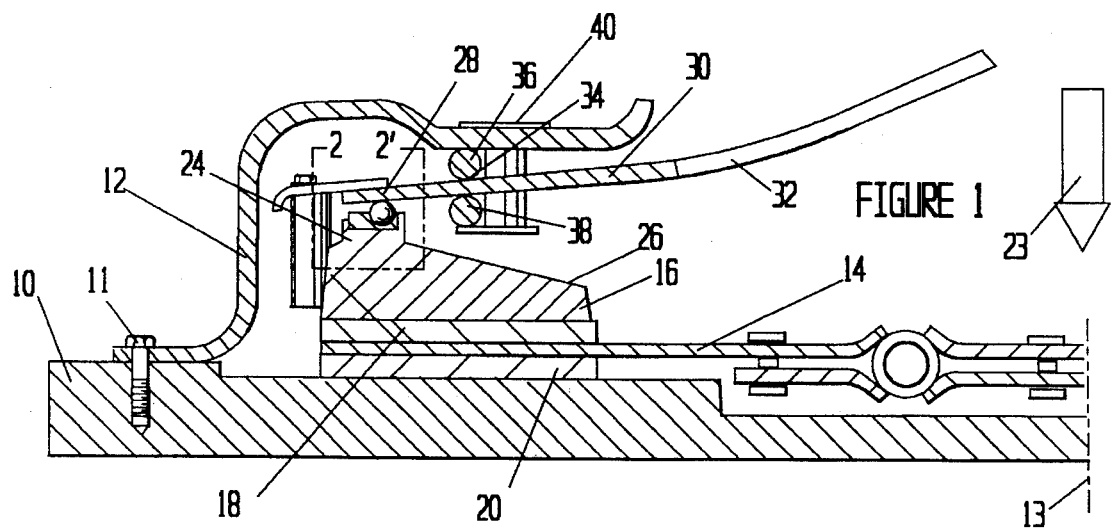
FIG. 1 is an elevational sectional view of a typical push-off automotive clutch modified in accordance with the invention.

Referring to FIG. 1, there is illustrated a sectional view of half of a conventional automotive clutch which has been modified in accordance with the invention. The clutch is mounted on a flywheel 10 with a clutch cover 12 that surrounds the assembly and which is fastened to the flywheel by conventional machine screws 11. The clutch assembly is oriented on the center line 13 of the flywheel 10.

A clutch disc 14 is located between the flywheel 10 and the pressure plate 16. Frictional facings 18 and 20 are provided on opposite sides of the clutch disc 14 and engage surfaces on the flywheel 10 and the pressure plate 16.

The pressure plate 16 has a raised circular rim 24 on its upper surface 26 which provides a support for the base 28 of the diaphragm 30. The diaphragm 30 is a Bellville conical spring diaphragm which has a plurality of radial slots 32, forming a plurality of fingers. The diaphragm 30 has a fulcrum support 34 on the undersurface of the clutch housing cover 12 which is formed by a pair of rings 36 and 38 which are located above and below the diaphragm 30 and supported by a metal fastener 40 that extends through the housing cover 12. The arrow 23 indicates the direction of the release force to disengage the clutch, hence the name "throw-in" clutch.

Figure 2:
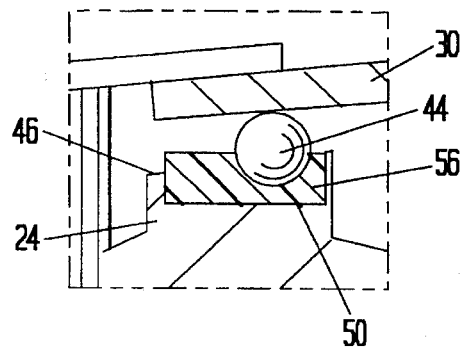
FIG. 2 is an enlarged view of the area within the box marked 2–2' in FIG. 1.

Referring to FIG. 2, the clutch is modified in accordance with this invention by providing a subassembly of a plurality of spherical balls 44, which are embedded in a ball retainer ring 56 which can be a molded plastic member having a plurality of spaced-apart recesses which receive and retain the balls 44 at their circumferentially spaced-apart locations. The number of balls 44, which are preferably located at equal angular increments about the pressure plate, can be from 4 to about 20, preferably from 6 to about 12, depending on the diameter and clamp load.

The subassembly of the retainer ring 56 and balls 44 can be readily manufactured in conventional injection molding equipment, in which the balls are inserted into the injection die prior to molding of the ring 56, or pressed into recesses of a molded ring. The subassembly can be readily manufactured to any desired diameter and thickness with any desired number of balls. This manufacture is performed at a factory under precisely controlled conditions to prepare subassemblies of high precision and at minimal costs.

The subassembly of the retainer ring 56 and balls 44 is located on the centerline 13 of the flywheel and clutch assembly by a center locator. For this purpose, at least one circular groove 50 can be formed in the upper edge 46 of the raised circular rim 24, with its center of radius located on the centerline 13, and the retainer ring 56 is seated in the circular groove, thereby locating it on the centerline 13 of the clutch.

Figure 3:
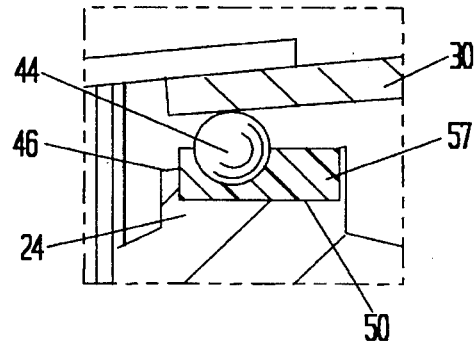

FIG. 3 shows an alternative retainer ring 57 in which the circular array of balls 44 has a greater radius from the centerline 13 than that shown in FIG. 2. This locates the balls 44 closer to the outer periphery of the diaphragm 30, permitting one to change the lever arm of the diaphragm 30 and thus provide a selectable control over the clamp load of the diaphragm.

FIG. 4 illustrates an alternative structure for the retainer ring 59. In this embodiment, the retainer is a thin ring, which can be formed of sheet or cast metal, or can be fiber reinforced plastics, e.g., carbon or fiberglass filled resins, preferably high temperature strength resins such as polyimides, etc. The balls 44 are seated in apertures of the ring 59. If desired, the apertures can be provided with annular rims 61 to enhance the retention of the balls 44. The ring 59 has an inner annular rim 62, and an outer annular rim 64, which engage the shoulders 66 of the raised rim 24 on the pressure plate 16, thereby orienting the ring and ball assembly precisely on the centerline 13 of the clutch. The use of a relatively thin retainer ring 59 minimizes the weight of the clutch. Additionally, the thin retainer ring 59 is supported apart from the pressure ring by the balls 44, thereby avoiding thermal conduction to the ring 59, and any possible high temperature distortion of the ring 59 by the frictional heat generated in the clutch assembly.

The thin metal ring 64 also permits rolling retention of the balls 44, so that the balls will provide a rolling contact with the diaphragm 30. Although the amount of frictional drag on the diaphragm is minimized with any of the embodiments of this invention since balls 44 make point contacts with the diaphragm, the rolling contact by balls 44, which are rotationally received in metal ring 64, effects even further reduction in friction and wear on the diaphragm 30.

Another alternative retainer ring and ball assembly is shown in FIG. 5. In this embodiment, the balls 44 are seated in an annular ring 68 which rests on the top edge 46 of the rim 26 of the pressure plate 16. The ring 68 has an inner annular flange 70 which forms a lip that engages against the inner shoulder 66 of the rim 26, thereby locating the ring and balls 44 on the centerline 13 of the clutch.

Referring now to FIG. 6, the balls 44 are shown in recesses of a molded ring 69, which rests on the upper surface 46 of rim 24 of the pressure plate 16. The ring and ball subassembly is located on the centerline 13 of the clutch by a plurality of metal dowel pins 71, which are placed in bores 73 in the pressure plate 17, and which project above the upper surface 46 into aligned, receiving apertures 75 in the ring and ball subassembly. At least several, preferably from 5 to about 10 dowel pins can be permanently seated in bores 73, which mate with aligned apertures in the ring 69 to retain the subassembly on the centerline 13. This embodiment of the invention, as the embodiments of FIGS. 4 and 5, locates the balls 44 on the pressure plate 16, so the plastic rings (68 or 69), or thin metal ring 64, are not placed under compressive loading between the diaphragm and the pressure plate. Instead, the rings only serve to maintain the circumferential spacings of the balls 44.

As shown in FIG. 7, the retainer ring and ball assembly of this invention can also reduce the mass and weight of the pressure plate by eliminating the raised rim 24, shown in the clutch 10 of FIG. 1. In this application, the pressure plate 74 can be a thin annular ring having a flat undersurface 76 to support the frictional facing 18. The necessary vertical stand-off that serves as the base for the fulcrum support of the diaphragm 30 is provided by the retainer ring 80, which can be cast of high temperature resistant plastics such as fiber reinforced polyimides, etc. The balls 44 are embedded in the ring 80 in a circular array at the proper radius from the centerline 13 of the clutch to provide the desired clamp load for the clutch. The pressure plate 74 is provided with an annular groove 82 which receives the ring and ball assembly and locates the assembly on the centerline of the clutch.

FIGS. 8–10 illustrate another alternative center locator in which a thin retainer ring 86 is provided with a center locator that comprises one or more circumferentially disposed pins, which are permanently seated in aligned apertures which are machined into the upper surface of the pressure plate 88. For this purpose, the retainer ring 86 can have peripherally located flanges 90 which have apertures to receive the upper ends of dowel pins 92.

FIG. 9 is a sectional view along line 9–9' of FIG. 8, illustrating the dowel pins 92 and receiving bores 94 in the pressure plate 88. Preferably dowel pins 92 are permanently seated in bores 94 in the pressure plate 88, by a friction fit, or by bonding or welding.

An alternative embodiment for the center locator is shown in FIG. 10. In this embodiment, the retainer ring 96 is cast as a one piece member having a plurality of peripherally disposed, integral prongs 98 which are one-piece with the retainer ring 96. If necessary, the shear strength of the prongs 98 can be enhanced by embedding a steel pin 100 within the prongs 98 by inserting steel pins into the mold cavity used for injection molding of the retainer ring 96. The pressure plate 96 is provided with a plurality of recesses or bores 94 which are located on a radius about the centerline of the clutch to receive the prongs 98 and orient the assembly of retainer ring 96 and balls 44 on the centerline 13 of the clutch.

Figure 11:
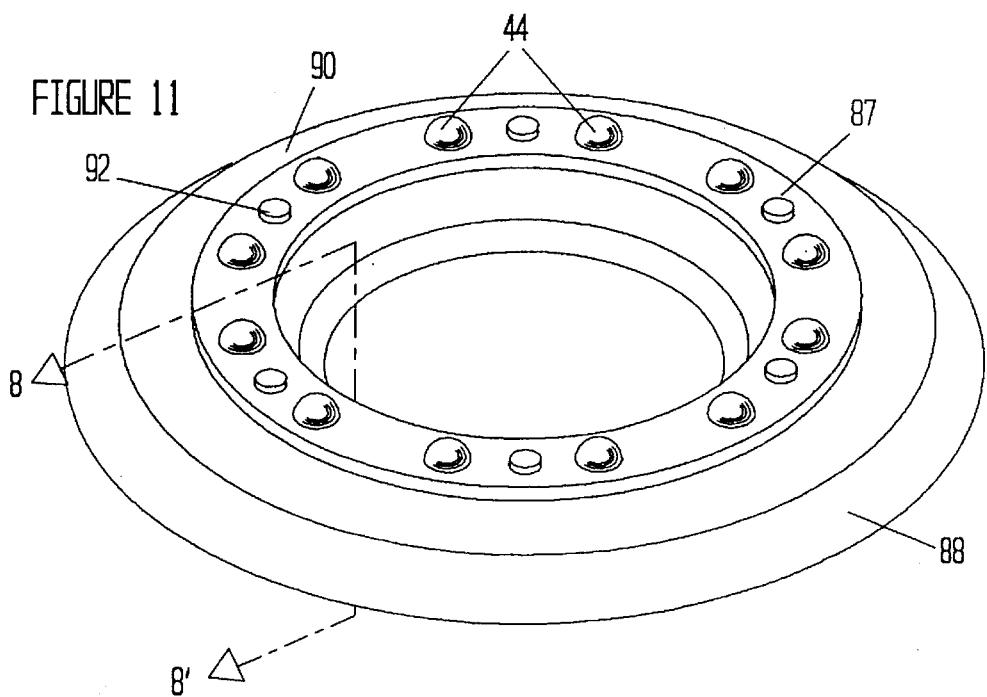
FIG. 11 is a perspective view of a pressure plate having a modificaton in accordance with the invention which is alternative to that of FIG. 8.
Figure 12:
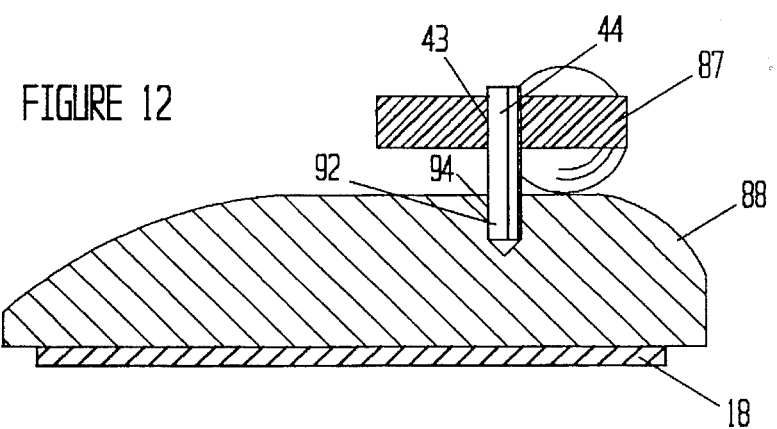
FIG. 12 is a sectional view along line 12'—12' of FIG. 11.

Referring now to FIGS. 11 and 12, an alternative retainer ring and ball assembly is illustrated. The retainer ring is shown above pressure plate 88, which is substantially identical to that shown in FIG. 8. The retainer ring 87 is molded with a plurality of spaced-apart balls 44, which are located at equally spaced angular increments; a total of 12 balls shown, at 30 degree incremental angular spacing. In this embodiment, however, the retainer ring is also provided with 6 apertures which are spaced about the ring at equal spacings. Dowel pins 92 are received in the apertures to secure the retaining ring in a centric relationship to the pressure plate. As shown in FIG. 12, the dowel pins are permanently seated in bores 94 in the top face of the pressure plate. As apparent from FIG. 11, the bores 94 are located in a circular arc about the centerline of the pressure plate. The dowel pins project above the face of the pressure plate sufficiently to extend through the retainer ring, and preferably slightly above the retainer ring. As with the embodiment of FIGS. 8–12, the balls 44 rest on the pressure plate, and their upper apices provide support for the diaphragm, in the manner shown in FIG. 1.

Referring now to FIGS. 13 and 14, there is illustrated a sectional elevational view of a throw out clutch mechanism. As with the throw-in clutch shown in FIGS. 1 and 2, the diaphragm 72 applies a clamp load to the pressure plate 78. The direction of the release force is shown by arrow 25. In this application, the diaphragm 72 has a fulcrum support on balls 44 which are carried on the upper edge 74 of a raised circular rim 76 on the upper face 80 of the pressure plate 78. As with the previously described embodiments shown in FIGS. 1 and 2, the balls 44 are permanently mounted in a retainer ring 56 at circumferentially spaced-apart locations.

The base 86 of the diaphragm 72 is supported by another subassembly having a circular array of balls 44 at circumferentially spaced-apart locations in retainer ring 102, which is received against the inside upper surface of the clutch cover 11. The retainer ring 102 is of sufficient diameter that its outer circular edge 104 is received against the upright wall 106 of the clutch cover 11, thereby locating the assembly of the ring 102 and balls 44 on the centerline 13 of the clutch. Preferably the edge 108 of the ring 102 is bevelled at an angle to mate with the wall 106 of the clutch cover 11 which, typically, is slightly inclined from a perpendicular relationship to the top wall.

If desired, to provide adjustment of the throw out force, the retainer ring and ball assembly can be provided in interchangeable assemblies having a different radius of the circular array of balls. FIG. 15 illustrates an alternative retainer ring 112, in which the balls 44 are located on a circular array having a slightly greater radius than that shown for retainer ring 102 in FIG. 14, thereby providing a selection in the clamp load of the clutch.

The invention significantly reduces the time and complexity of conversion of a conventional clutch to the improved structure over that disclosed in my prior patent. Since the balls are precisely located in an assembly with the retainer ring at the factory, insertion of individual balls into a clutch by the service or maintenance crew is avoided.

The invention reduces the area of the contact between the diaphragm and its supports on the pressure plate, and/or on the clutch cover. This reduction in contacting area reduces the frictional drag on the engagement and disengagement of the clutch and avoids the hysterisis exhibited with conventional clutches. Another significant advantage is that the reduced area of contact between the pressure plate and diaphragm greatly reduces thermal conduction between these components, with the result that runs cooler, as there is less heat transfer from the pressure plate.

The balls can be formed of hard steel, either from hard steel alloys or case hardened. This permits use of lighter metals for construction of the pressure plate, e.g., the use of aluminum or magnesium, or their alloys, or high strength reinforced plastics for ultra light pressure plates with no sacrifice of wear resistance.

Since the invention does not radically change the design of automotive clutches, it can be readily adopted to existing clutches by replacement of the pressure plate, and in some instances by machining or replacement of the clutch cover. This avoids any significant new expenditures for tooling by the original manufacturer, and also permits retrofitting of existing vehicles, since replacement of the necessary parts is within the capability of conventional automotive shops and garages.

The invention also provides a simple adjustment capability to modify the clamp pressure and the pedal pressure of clutches by permitting the mechanic to relocate the bearing points on the diaphragm, simply by changing the location of the balls, or rollers on the pressure plate, which changes the lever arm of the diaphragm.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. In an automotive clutch assembly supported on an automotive flywheel, said assembly having a clutch cover supported on said flywheel along the centerline thereof and surrounding a pressure plate with a spring diaphragm biased between a pressure plate and the clutch cover, a clutch disc located between said pressure plate and flywheel, the improvement which comprises: a subassembly of a plurality of circumferentially spaced-apart balls and a ball retainer ring with a like plurality of recesses, one each receiving one of said balls to maintain said balls in said circumferentially spaced-apart locations, said retainer ring being received between at least one of said pressure plate and clutch cover and said diaphragm to provide the bearing contact surface between said diaphragm and said one of said pressure plate and clutch cover, and said ball retainer has a center locator to orient said subassembly to said center line.

2. The improvement of claim 1 wherein said balls are received between said diaphragm and said pressure plate.

3. The improvement of claim 2 wherein said retainer ring and balls are received on the upper surface of said pressure plate.

4. The improvement of claim 1 wherein said retainer ring is plastic molded about said spherical balls.

5. The improvement of claim 1 wherein said balls are carried on the upper surface of said pressure plate.

6. The improvement of claim 4 wherein said pressure plate has a raised circular rim about its upper face which includes a circular groove in the upper edge of said rim, and with said retainer ring and balls received in said circular groove.

7. The improvement of claim 5 wherein said pressure plate has a raised circular rim about its upper face which includes a circular groove in the upper edge of said rim and including a subassembly of said balls received in said ball retainer ring which is received in said circular groove.

8. The improvement of claim 7 wherein said subassembly of said balls and retainer ring is a molded ring with said balls spaced therein as a circumferential array of equally spaced balls.

9. The improvement of claim 7 including at least two interchangeable subassemblies with said balls being located in circumferential arrays of of different diameters to permit variable selection of the clamp pressure of the clutch by selection of one of the subassemblies.

10. The improvement of claim 1 wherein said balls and retainer ring are received between said diaphragm and the undersurface of said clutch cover.

11. The improvement of claim 10 wherein said retainer ring and said balls are a subassembly of said balls received in said retainer ring in a circumferential array.

12. The improvement of claim 11 wherein said subassembly comprises a plastic ring molded about said balls.

13. The improvement of claim 11 including a second retainer ring and a second plurality of balls received therein in a circumferential array, and carried on said pressure plate.

14. The improvement of claim 13 wherein said pressure plate has a raised circular rim about its upper face which includes a circular groove in the upper edge of said rim, and said second retainer ring and second plurality of balls are received in said circular groove.

15. The improvement of claim 14 wherein said retainer means is a plastic ring molded about a circular array of equally spaced apart balls.

16. The improvement of claim 14 including at least two interchangeable subassemblies with said balls being located in circumferential arrays of of different diameters to receive said balls and thereby permit variable selection of the clamp pressure of the clutch by selection of one of the subassemblies.

17. The improvement of claim 1 wherein said pressure plate has a raised circular rim with an inner annular shoulder about its upper face and said retainer ring has an annular lip which is received against said inner annular shoulder to serve as said center locator.

18. The improvement of claim 17 wherein said raised circular rim also has an outer annular shoulder and said retainer ring has a second annular lip which is received against said outer annular shoulder.

19. The improvement of claim 1 including a plurality of dowel pins located in the upper surface of said pressure plate and secured to said retainer ring at selected locations to serve as said center locator.

20. The improvement of claim 19 wherein said retainer ring has a like plurality of bores, one each receiving a respective one of said dowel pins.

\* \* \* \* \*